United States Patent [19]

Brennan

[11] Patent Number: 4,536,027
[45] Date of Patent: Aug. 20, 1985

[54] CONVERTIBLE SEATING UNIT
[75] Inventor: Edward J. Brennan, Litchfield, Conn.
[73] Assignee: PTC Aerospace Inc., Bantam, Conn.
[21] Appl. No.: 605,453
[22] Filed: Apr. 30, 1984
[51] Int. Cl.³ .............................................. A47B 85/04
[52] U.S. Cl. ................................ 297/124; 244/122 R; 297/146; 297/191; 297/379
[58] Field of Search ............... 297/124, 237, 127, 135, 297/378, 379, 61, 408, 391, 146, 163, 118; 244/122 R; 296/65 R, 37.5

[56] References Cited
U.S. PATENT DOCUMENTS

| 2,240,748 | 5/1941 | Bak ........................ 297/146 |
| 3,224,808 | 12/1965 | Spielman ................. 297/378 X |
| 3,336,077 | 8/1967 | Radke et al. .............. 297/378 X |
| 3,374,032 | 3/1968 | Giudice ................... 297/124 X |
| 3,449,012 | 6/1969 | Caron ..................... 297/378 |
| 3,512,827 | 5/1970 | Stange .................... 297/378 |
| 3,877,747 | 4/1975 | Brennan ................... 297/146 X |
| 4,376,552 | 3/1983 | Pilhall ................... 297/379 X |

Primary Examiner—James T. McCall
Attorney, Agent, or Firm—Thomas K. McBride; William H. Page, II; Barry L. Clark

[57] ABSTRACT

Multipassenger aircraft seat has at least one seating position which can be converted from a seat to a cocktail table to increase the comfort of adjacent seat passengers. The headrest pivots about 180° relative to the back cushion frame so that it becomes hidden under the back cushion frame and in compressed contact with the lower seat cushion when a cocktail table on the back cushion frame is deployed in a horizontal plane. Concealed locks inside the headrest permit the headrest and back cushion frame to be firmly locked to the reclinable main seat back frame.

8 Claims, 14 Drawing Figures

CONVERTIBLE SEATING UNIT

BACKGROUND OF THE INVENTION

The invention relates to seating and particularly to seating for aircraft. Typically, aircraft for commercial use are configured with one region having relatively widely spaced seats for first class passengers and another having closely spaced seats for coach or tourist class passengers. However, in trying to better serve the coach passenger willing to pay full fare or even a premium fare for upgraded service, many airlines have developed a "business class" service. Such "business class" service can take many forms. Sometimes it offers only the regular coach seats in a separate quiet section of the aircraft. In another instance, wider seats arranged at a greater pitch might be offered. In still another situation, a part of a seat back cushion can be folded forward on the center seat of a triple seat to provide a cocktail table separator between seats. In such a design as is shown in U.S. Pat. No. 3,877,747, the headrest of the center seat remains upright since it is integral with the seatback, thus retaining privacy. Other somewhat similar designs permit the upper part of the seatback to pivot forward so that a plastic tray mounted on the back of the headrest becomes a small cocktail table. This design, because it has a normally rearwardly facing plastic tray on the headrest, is not too esthetically pleasing to a passenger seated in an aft row when the seat is upright. Also, the seatback, when pivoted forward, is quite long, causing it to extend over the front edge of the seat where it interferes with aisle access. A step of considerable height is located between the narrow cocktail table and a large flat area behind it, making it necessary for someone laying a drink down on the table to be very careful to avoid spilling it. A variation of the last mentioned design is to leave the tray off the back of the headrest so that there then is, when the seatback is folded forward, a large upholstered area in front of the large flat area. The two areas are still separated by a step with the possibility of spills. Also, a spill on the upholstery is far more damaging than one on a plastic tray.

The esthetic advantages of a seat in which the headrest can be pivoted down with the back are considerable since one viewing a cabin full of such seats in between others on a large aircraft gets an impression of spaciousness and comfort. Furthermore, with the extremely competitive marketing strategies developed by various airlines, it would be highly advantageous to have a seat that could be quickly converted to a table. Thus, an airline could match different competitors' claims to having 6 abreast seating, or 8 abreast seating, depending upon the market being sold, by merely folding down seatbacks. For example, a 2-5-2 configuration could be converted to 2-2-2-2 by folding over the center seat in the center group of 5. A 2-4-2 configuration could be converted to a 2-1-1-2 by converting both center seats. The latter configuration would greatly enhance the comfort of the two center section passengers between the aisles since they would be spaced from each other by a distance greater than the distance from the passenger across the aisle. However, for reasons noted supra, the use of existing designs of forward folding tray table-headrest combinations presents various problems including aisle interference and an uneven support surface. The latter problem arises from the fact that the back of the headrest extends higher than does the offset back of the folding seat cushion which must fit in a recess in the seat back frame when positioned in a seating configuration.

SUMMARY OF THE INVENTION

It is among the objects of the present invention to provide a convertible aircraft passenger seat which can be quickly changed from a seat to a cocktail table or work surface which increases the comfort of the occupant of an adjacent seat. A further object is to provide such a seat in which the upper part of a seat back can be moved forward to provide an appearance of comfort and openness in a cabin but without introducing the disadvantages of prior art seats of this general type. Another object is to provide a seat in which the headrest can be stored out of the way and out of sight when the cocktail table is deployed. Yet another object is to provide a convertible seat which offers not only a large unstepped table work surface when the seat back is folded down but also provides additional flat storage space on the front of the seat under the table. A still further object is to provide a convertible seat which has one locking means to prevent inadvertent movement of the headrest from its vertical position and another to lock the cocktail table in its deployed position.

The foregoing and other objects are attained by the disclosed embodiment of the present invention wherein a seat back cushion and frame assembly which has a tray on its rear surface is pivoted relative to the main seat frame. The assembly is mounted so that it is stored in a recess in the seat back frame when in a use position or deployed so the tray lies horizontally. A headrest assembly is pivotally mounted to the aforementioned seat back cushion and frame assembly. Hidden latch releases on the sides of the headrest permit the headrest to be rotated on a pair of links carried by the seat back cushion and frame assembly away from its locked position overlying and capturing an upper portion of the seat back frame. Continued rotation of the headrest over about 180° brings it into contact with the front surface of the seat back cushion. The seat back cushion and headrest are then pivoted forwardly together for about 105° until the headrest, which is now hidden, contacts the seat bottom cushion. Additional downward pressure is then applied to the forward edge of the cocktail table while rearward pressure is applied to the headrest until the table is level. These latter forces cause part of the linkage that mounts the seat back cushion and frame assembly to the seat frame to snap over a retaining hook on the main frame and be retained thereby due to the compression of the seat bottom cushion and headrest.

DETAILED DESCRIPTION OF THE PREFERRED EMBODIMENT

Figure 3:
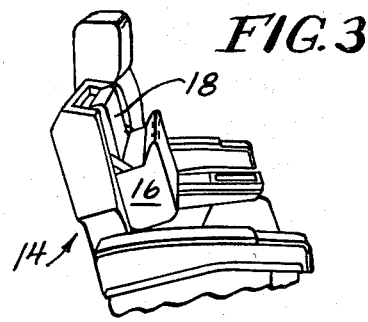
Figure 4:
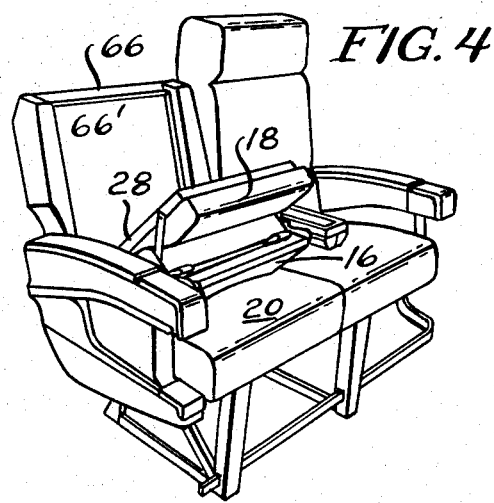

Referring to FIGS. 1-5, a double seating unit 10 is shown as comprising a conventional seat assembly 12 and a convertible seat assembly 14. The conventional seat assembly 12 would generally be located on an aisle and would thus not normally need to be constructed with a folding headrest or cocktail table. The convertible seat 14 would generally be utilized at a seat position removed from an aisle or as the center seat of a triple. In such a position, it is best adapted to increase the comfort of a passenger(s) in an adjacent seat(s) since the headrest 16 and seat back cushion 18 can be folded and moved to a stored position overlying the seat bottom cushion 20. The general sequence of operations required to move the cocktail table 24 from its FIG. 1 position to its FIG. 5 position commences with the application of manual pressure to both sides of the headrest 16. The pressure causes a concealed lock button 26 on each side of the headrest to be depressed, thus releasing the headrest locking system which will be hereinafter described. Once the lock is released, the headrest 16 is pivoted about 180° until it is resting against the front surface of seatback cushion 18, as shown in FIG. 3. At this point, the seatback cushion 18 and its frame 28 are pivoted forward to the FIG. 5 position wherein the headrest 16 and seat bottom cushion 20 are slightly compressed, and the table surface 24, which is mounted on the back cushion frame 28 is generally horizontal. Another locking system, which will also be hereinafter described, locks the table 24 in its horizontal position against the upward bias exerted by the compressed headrest and cushion.

Figure 9:
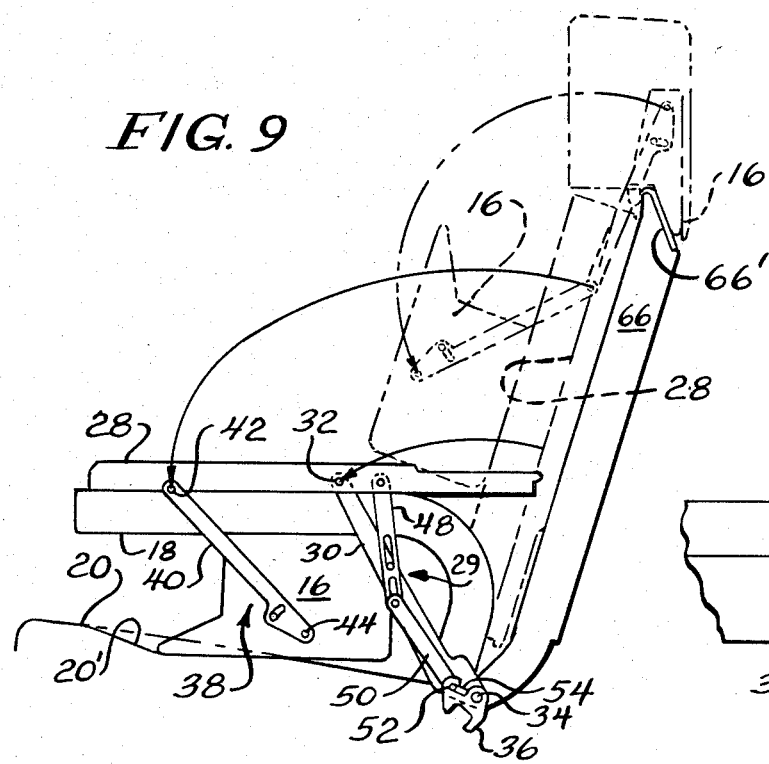
FIG. 9 is a partially broken away side view of the seat with its FIG. 5 position indicated in solid lines and its FIG. 1 and FIG. 3 positions indicated with dotted lines.
Figure 10:
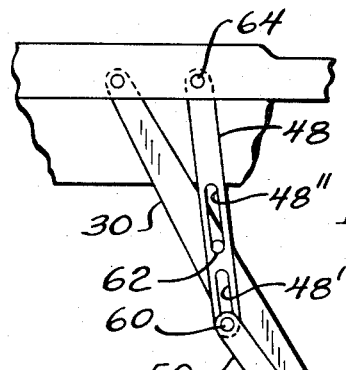
FIG. 10 is an enlargement of a portion of FIG. 9 which illustrates the table linkage in its locked position.
Figure 11:
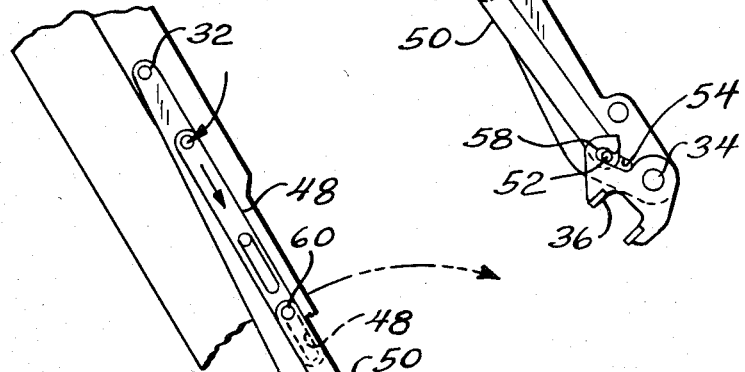

FIG. 9 illustrates the mounting linkage 29 for the seat back cushion frame 28. The cushion or secondary frame 28 is pivotally mounted relative to the main seat frame or base by a link 30. The link 30 is pivoted at its upper end to the cushion frame by a pin 32 and is pivoted at its lower end to the seat frame (not shown) by a pin 34 carried by a mounting bracket 36 which is mounted to the seat frame. The pin 34 also supports the primary, reclinable seat back frame 66. The headrest linkage 38 pivotally mounts the headrest 16 to the cushion frame 28 by a link 40 which is pinned to the frame 28 at 42 and to the headrest at 44. Additional portions of the linkage 29 include a tension link 48 and a stop link 50, which cooperate with the link 30 to maintain the cushion frame 28 in the locked horizontal position shown in solid lines. The horizontal position is maintained by tensioning the links 48 and 50 by means of an upward biasing force produced by the compression of the foam in headrest 16 and seat cushion 20. The compression is indicated by the dotted line 20' which indicates the location of the seat cushion surface 20 before the headrest 16 is forced into it. A pin 52 is mounted at the lower end of stop link 50 and is adapted to travel in guide slot 54. The guide slot 54 is formed in link 30 in a location wherein it will be in alignment with an imaginary line joining pin 34 and the center of the hoop-shaped latch portion 58 (FIG. 10) formed on bracket 36 when the link 30 is in its FIG. 9 forward position. The latch portion 58, friction in the linkage 29, and a stop (not shown) on the bracket 36 which limits the forward movement of link 30, cooperate to lock the deployed frame 28 in its FIG. 9 and FIG. 10 horizontal position. In this position, additional downward movement of the front end of frame 28 is prevented since both of links 48 and 50 are tensioned due to the fact that the lower end of slot 48' engages pin 60 mounted at the top of link 50 while the lower end of slot 48" engages pin 62 mounted on link 30. Thus, an effort to rotate the cushion frame 28 counterclockwise about its pivot connection 32 would be prevented since tension link 48 is pivoted to the cushion frame at 64. When the cushion frame 28 is lifted at its forward end and pushed down at its rearward end against the friction between pins 60, 62 and the links 30, 48 to move it from its FIG. 10 position to its FIG. 11 intermediate position, the tension link 48 is forced down, thus causing stop link 50 to be pushed down to the bottom of slot 54 as the upper end of slot 48' engages pin 60. Once pin 52 is clear of the hook or latch portion 58 of the bracket 36, additional clockwise movement of the cushion frame 28 will force the frame 28 into a recess 66' in the main seat back frame 66. At this point, the cushion frame 28 will be in its dotted line position in FIG. 9 with the headrest 16 in its dotted line position in front of it. To return the headrest 16 to its full upright position, manual pressure must again be applied to its sides to depress the lock buttons 26 as the headrest is pivoted clockwise to its upper dotted line position. When the lock buttons are released, the headrest will be locked relative to the seatback frame 66 since the downwardly projecting portion 16' will be overlying the upper tapered end portion 66' of the frame 66. When the headrest 16 is compressed into the seat cushion 20, a storage shelf 20' is formed which can be used by an occupant to accommodate a book or a calculator, for example, without fear of having it slide rearwardly where it could get hidden and lost.

Figure 12:
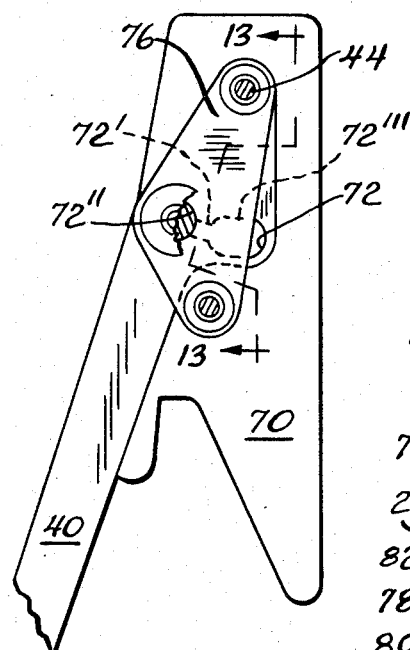
FIG. 12 is an enlarged partially broken away side view of the headrest support linkage.
Figure 13:
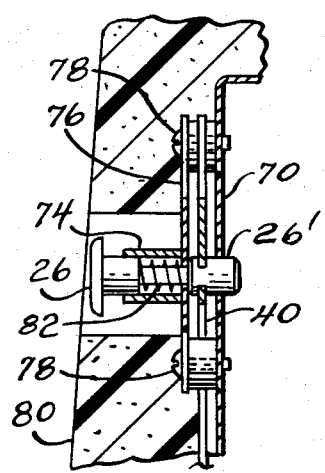
FIGS. 13 and 14 are enlarged fragmentary rear views taken on lines 13—13 in FIG. 12 but with the headrest foam padding included to illustrate its relationship to the headrest locking linkage in its locked and unlocked configuration.
Figure 14:
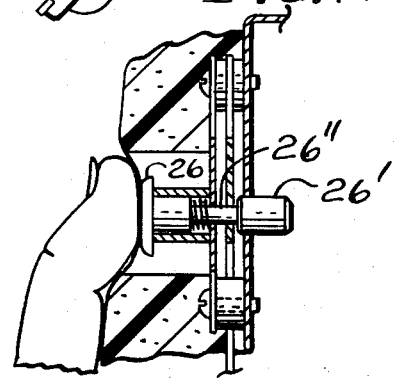

FIGS. 12-14 illustrate the details of the headrest locking mechanism 38. The large plate portions 70 comprise the sides of an internal support structure to which the pivot link 40 is mounted by means of pin 44. The upper end of the link 40 has a region of enlarged width which contains an elongated slot 72. The slot has a restricted width region 72' located between an enlarged diameter circular opening 72" and an enlarged diameter elongated opening 72'''. The lock button 26 is guided for axial motion by a sleeve member 74 affixed to a plate 76 which is mounted to plate portion 70 by fasteners 78. As can be seen in FIGS. 13 and 14, the button 26 is recessed just under the foam cushioned upholstery 80 of the headrest so that finger pressure can compress the foam and move the button axially inwardly against the force of return spring 82. As can be seen in FIGS. 12 and 13, the enlarged diameter locking pin portion 26' of the button 26 is firmly engaged with the large opening 72" and unable to move through the restricted opening 72'. Thus, the plate portion 70 and the headrest 16 are held fixed relative to the link 40. However, when the button 26 is depressed, as shown in FIG. 14, its reduced diameter portion 26" moves into the plane of slot 72 in link 40. In this position, it is possible to swing the button 26 and the headrest 16 to which it is attached through an arc from one end of the slot 72 to the other, thus permitting the lower portion 16' of the headrest to be released from its engagement with the upper seatback frame portion 66' (FIG. 1).

Figure 1:
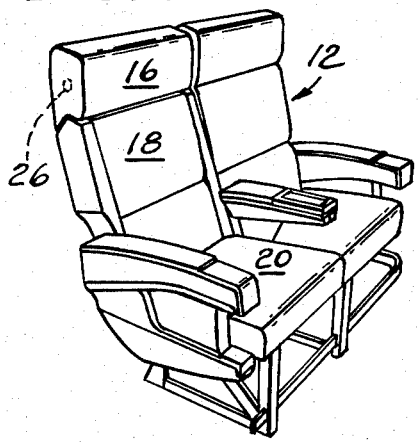
FIGS. 1–5 are perspective views illustrating the convertible seat in various stages as it is manually converted from a seat to a cocktail table.
Figure 2:
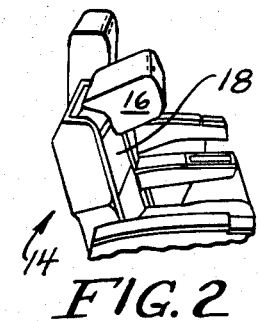
Figure 5:
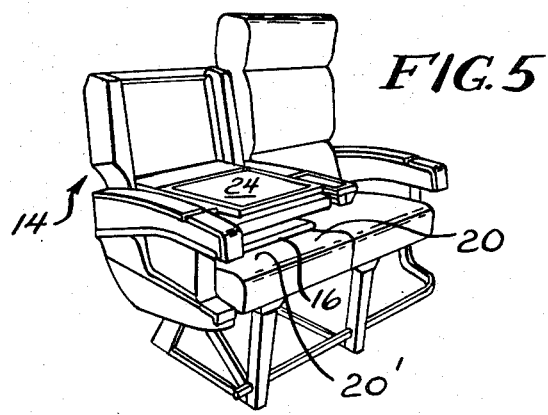
Figure 6:
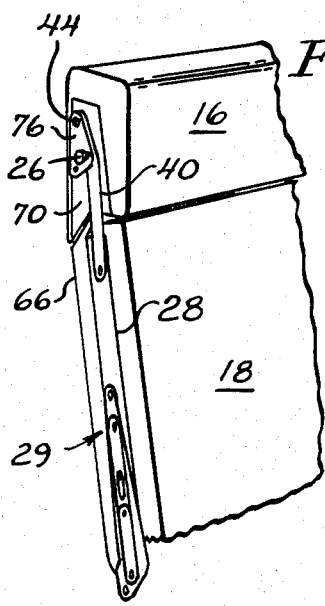
FIGS. 6–8 are fragmentary, partially broken away perspective views illustrating the position of the linkage mechanisms when the seat is in the position shown in FIGS. 1, 3 and 5.
Figure 7:
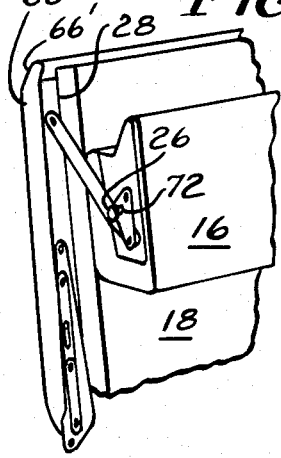
Figure 8:
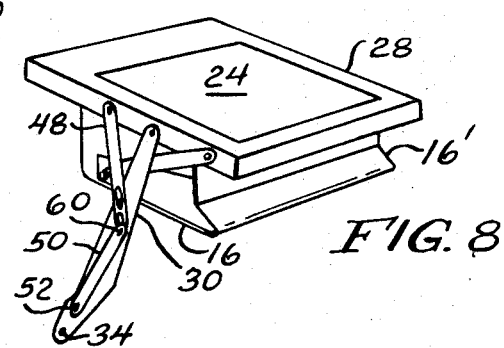

FIGS. 6-8 are partially broken away perspective views which correspond generally to FIGS. 1, 3 and 5 to illustrate the progressive position changes of the headrest 16, the back cushion 18, the headrest link 40 and the cushion frame linkage 29. The figures also show the general relationship of the headrest 16 to the back cushion 18 and back cushion frame 28 which are detailed in FIGS. 12–14. Finally, they show the general relationships between the back cushion frame 28 and the linkage 29 shown in FIGS. 9–11, and particularly the solid line and two phantom positions of the headrest 16 in FIG. 9.

I claim as my invention:

1. In a multipassenger seating unit having a plurality of seating positions, at least one of which has a backrest which is pivotally mounted for reclining movement relative to the base frame of the unit and includes portions which are selectively convertible from being useable for seating to being useable as a seat separator and cocktail table to enhance the comfort of an occupant of an immediately adjacent seating position, the improvement comprising a primary back frame member pivotally mounted at its lower end for reclining movement relative to the base frame of the seat, a secondary frame assembly pivotally mounted to a multiple link support assembly which is pivoted at or near its lower end to said primary back frame member and to said base frame on the same pivot axis as said back frame primary member, said secondary frame assembly having a back support cushion located on the side thereof which faces forward when said at least one seating position is in a seating mode and a cocktail table located on the opposite side thereof which is horizontal when said at least one seating position is in use as a seat separator, a headrest assembly pivotally mounted to said secondary frame assembly by an elongated link and means for selectively latching said headrest assembly to said elongated link, said headrest assembly being adapted when unlatched, to be pivoted downwardly approximately 180° from a use position when said back support cushion is in its seating use position to a storage position in contact with a surface portion of said back support cushion, said headrest assembly being further pivotable approximately 90° with said secondary frame assembly while in said storage position to a relatively hidden position under said cocktail table when said secondary frame assembly and multiple link support assembly are moved so as to deploy said cocktail table in its use position as a seat separator.

2. A selectively convertible seating unit in accordance with claim 1 wherein said headrest assembly includes an extension portion which projects downwardly at the rear of said unit when said unit is in a seating mode, said extension portion being of a shape which is complementary to and overlies the upper rear portion of said primary back frame member, said extension portion and said means for selectively latching said headrest assembly cooperating to prevent said headrest assembly or secondary frame assembly from being moved forward relative to said primary back frame member when said unit is in a seating mode.

3. A selectively convertible seating unit in accordance with claim 1 wherein said means for selectively latching said headrest assembly comprises a guide slot with enlarged width portions at its ends and an axially positionable guide pin which has a large diameter portion which is normally biased into latching engagement with one of the enlarged width portions of said guide slot, said guide pin being selectively movable relative to said guide slot to bring a small diameter portion into unlatched engagement with said guide slot, one of said guide slot and guide pin elements being on said elongated link and the other being on said headrest assembly.

4. A selectively convertible seating unit in accordance with claim 3 wherein the guide slot is formed in said elongated link and the guide pin is mounted for axial movement on said headrest assembly.

5. A selectively convertible seating unit in accordance with claim 4 wherein said guide pin is concealed under an upholstery cover on said headrest assembly and actuated by manual pressure applied through the cover.

6. A selectively convertible seating unit in accordance with claim 1 wherein said headrest assembly and said multiple link support assembly cooperate to maintain the secondary frame assembly in a generally horizontal position when said cocktail table is in its deployed use position.

7. A selectively convertible seating unit in accordance with claim 6 wherein said multiple link support assembly has mounted thereto a primary pivot link joining said secondary frame assembly to said pivot axis on said base frame and a pair of additional links which have lost motion pin and slot connections to each other and to said primary link, one of said pair of additional links being pivoted to said secondary frame assembly at a location spaced from said primary link and the other of said pair of additional links having a pin on its lower end which is guided in a slot in said primary link and is also restrained by the base frame against upward movement when tensioned by the resilient compression of the headrest assembly between a lower seat cushion and the secondary frame assembly, said pin on the other of said pair of additional links being moved out of restraining engagement with said base frame when said secondary frame is pivoted from its horizontal use position.

8. A selectively convertible seating unit in accordance with claim 1 wherein said headrest is compressed against a seat bottom cushion when in its relatively hidden position so as to prevent the possibility of articles laid on the seat bottom cushion forward of it from sliding between the headrest and seat bottom cushion.

* * * * *